(12) United States Patent
Zacho et al.

(10) Patent No.: US 7,685,972 B2
(45) Date of Patent: Mar. 30, 2010

(54) PET LEASH

(76) Inventors: Bradley Gene Zacho, 1815 First Ave., Newport, MN (US) 55055; Timothy David Peterson, 2071 Carroll Ave., St Paul, MN (US) 55104

( * ) Notice: Subject to any disclaimer, the term of this patent is extended or adjusted under 35 U.S.C. 154(b) by 47 days.

(21) Appl. No.: 12/017,899

(22) Filed: Jan. 22, 2008

(65) Prior Publication Data

US 2008/0173256 A1      Jul. 24, 2008

Related U.S. Application Data

(60) Provisional application No. 60/881,556, filed on Jan. 22, 2007.

(51) Int. Cl.
*A01K 27/00* (2006.01)
(52) U.S. Cl. ...................................... 119/793
(58) Field of Classification Search ................. 119/770, 119/797, 793, 795, 776, 772, 786, 787, 788, 119/792; D30/153
See application file for complete search history.

(56) References Cited

U.S. PATENT DOCUMENTS

| | | | | | |
|---|---|---|---|---|---|
| 3,563,208 | A | * | 2/1971 | Nero | 119/770 |
| 5,351,654 | A | * | 10/1994 | Fuentes | 119/770 |
| 5,632,234 | A | * | 5/1997 | Parker | 119/795 |
| 5,732,663 | A | * | 3/1998 | Manzella | 119/798 |
| 6,223,694 | B1 | * | 5/2001 | Rubin | 119/795 |
| 6,422,176 | B1 | * | 7/2002 | Tonuzi | 119/770 |
| 6,460,488 | B1 | * | 10/2002 | Manzella et al. | 119/798 |
| 6,701,873 | B2 | * | 3/2004 | Fradette, II | 119/784 |
| 6,827,045 | B1 | * | 12/2004 | Willner et al. | 119/795 |

* cited by examiner

*Primary Examiner*—Thomas Price
(74) *Attorney, Agent, or Firm*—Fredrikson & Byron, P.A.

(57) ABSTRACT

Embodiments of the present invention provide a pet leash that permits a pet handler to bring his/her pet under control urgently in a steady and reliable manner. Embodiments include a handle, a lead mechanism, an elongate portion extending therebetween, and multiple grip points on the elongate portion. A pet handler can grip the handle or one of the grip points with one hand and grip another of the grip-points with the other hand.

31 Claims, 3 Drawing Sheets

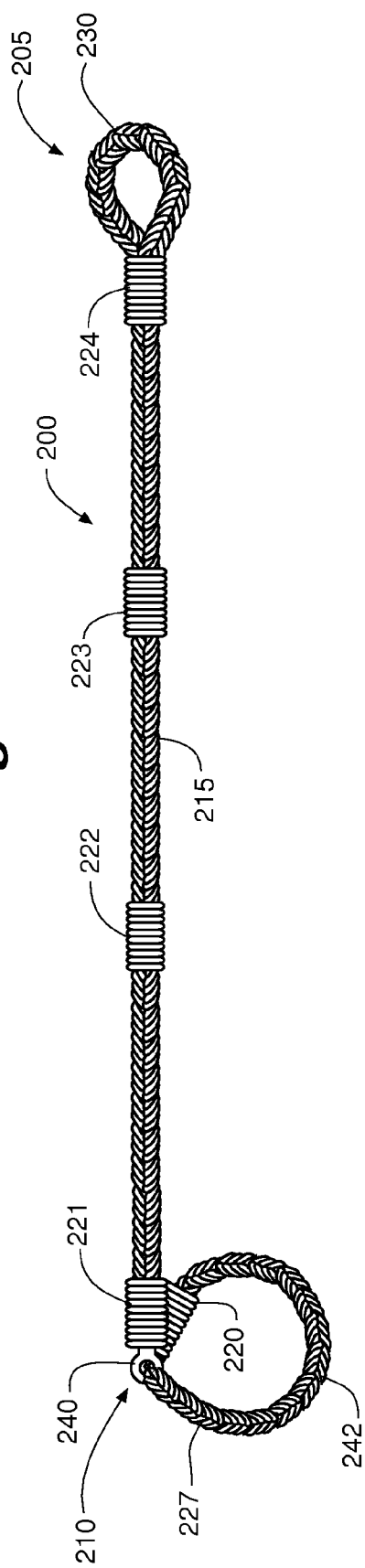

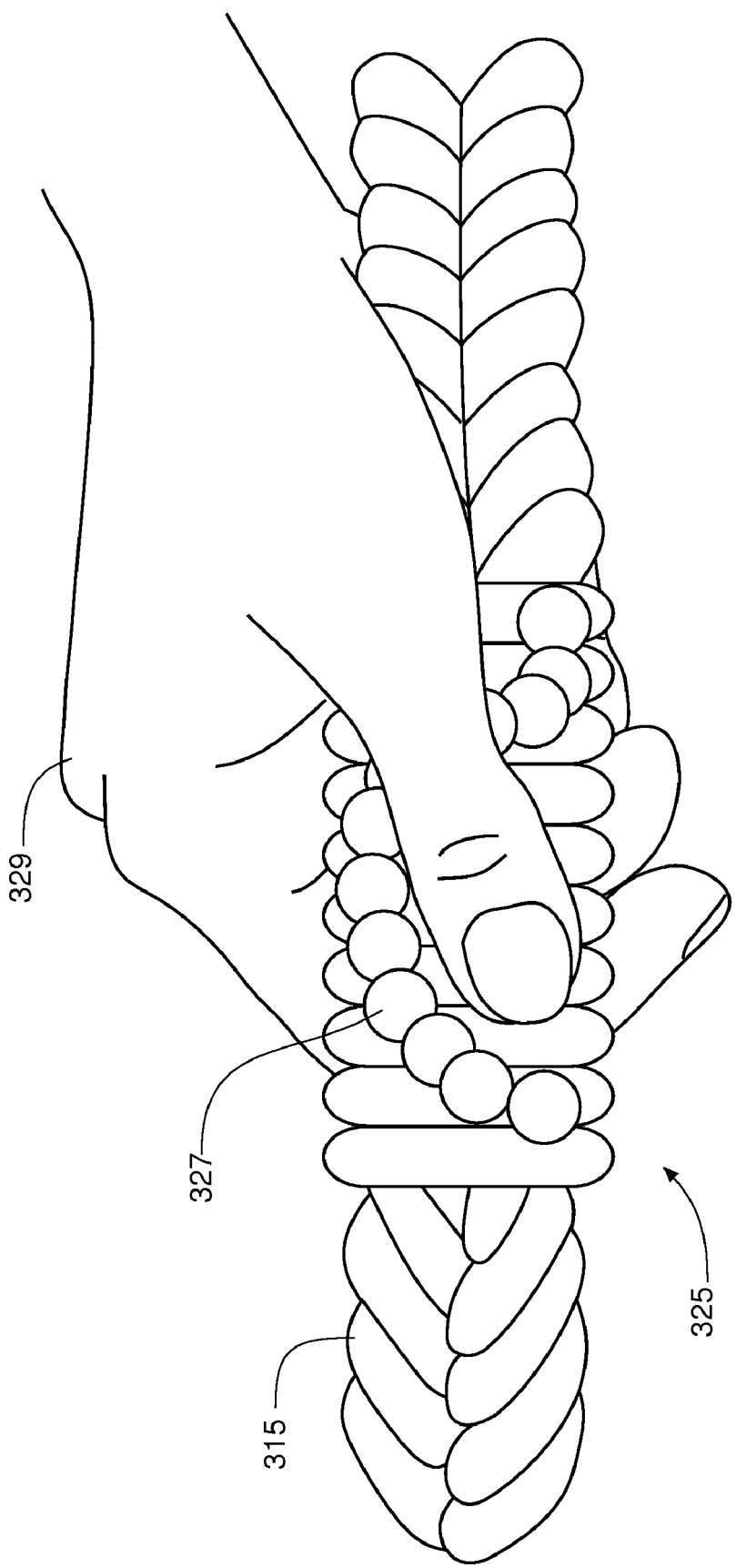

PET LEASH

CROSS-REFERENCE TO RELATED APPLICATION

This application claims priority under 35 U.S.C. §119(e) to U.S. provisional application 60/881,556, filed Jan. 22, 2007, which is hereby incorporated by reference in its entirety.

TECHNICAL FIELD

The present invention is related to pet leashes and, more particularly, to pet leashes that permit greater control over the leashed pet.

BACKGROUND

In many situations, it is important that pets on leashes be controlled by the person holding the leash. For example, if a dog owner is walking his/her dog and stops to talk with someone, he or she may need to bring the dog under greater control (e.g., if the dog gets unduly excited, if the person with whom he/she is talking has a small child, etc.). Conventional pet leashes leave much to be desired in terms of this greater level of control.

One kind of dog leash includes a first handle for allowing the fullest extent of the leash and a second handle to be grabbed in order to pull the dog closer. Such a dog leash poses multiple problems. First, in situations such as those mentioned above, the pet must be brought under greater control in an urgent manner. Grabbing for the second handle can be difficult, and accidentally missing the second handle can result in the pet causing harm. Second, with only one intermediate handle, there is only minimal flexibility in terms of how much control to exert—the dog can be free to use the full extent of the leash or he can be pulled to the intermediate distance. Moreover, adding additional handles to improve flexibility would result in a leash that is quite cumbersome to use.

SUMMARY

Embodiments of the present invention provide a pet leash that permits a pet handler to bring his/her pet under control urgently in a steady and reliable manner. Embodiments include a handle, a lead mechanism, an elongate portion extending therebetween, and multiple grip points on the elongate portion. A pet handler can grip the handle or one of the grip points with one hand and grip another of the grip-points with the other hand.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 2 is a schematic plan view of an illustrative pet leash according to embodiments of the present invention.

FIG. 3 is a schematic plan view of an illustrative grip-point according to embodiments of the present invention.

DETAILED DESCRIPTION

Figure 1:
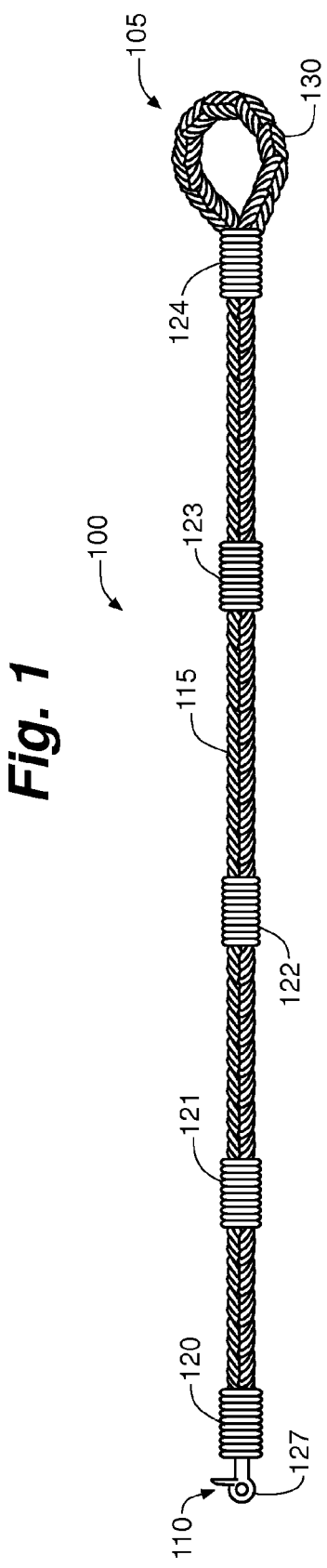
FIG. 1 is a schematic plan view of an illustrative pet leash according to embodiments of the present invention.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

FIGS. 1 and 2 show pet leash embodiments that are illustrative of the present invention. A common kind of pet leash is a dog leash, though other kinds of pet leashes are possible. The pet leash 100 of FIG. 1 includes a handle 105, a lead mechanism 110, an elongate portion 115, and multiple grip-points 120-124. Likewise, the pet leash 200 of FIG. 2 includes a handle 205, a lead mechanism 210, an elongate portion 215, and multiple grip-points 220-224. Referring to FIGS. 1 and 2, as is discussed in greater detail below, the handle 105, 205 can have a handle cross-sectional profile, the elongate portion 115, 215 can have an elongate portion cross-sectional profile, and the grip-points 120-124, 220-224 can have grip-point cross-sectional profiles. When discussing cross-sectional profiles, this document assumes that the cross-section is in a plane that is generally perpendicular to the page and generally perpendicular to the direction of the pet leash 100, 200 (both as shown in FIGS. 1 and 2).

Referring to FIGS. 1 and 2, the primary difference from the pet leash 100 of FIG. 1 and the pet leash 200 of FIG. 2 relates to the lead mechanism 110, 210. The lead mechanism 110 of FIG. 1 is a clasp lead, and the lead mechanism 210 of FIG. 2 is a slip lead. The clasp lead can secure the pet leash 100 to a pet by attaching the clasp 127 to the pet's collar. The slip lead can secure the pet leash 200 to a pet by increasing the size of the adjustable-sized lead loop 227, slipping the lead loop 227 over the head of the pet, and pulling on the handle 205 to decrease the size of the lead loop 227 so that the lead loop 227 engages the pet. Many lead mechanisms are possible, with the slip lead and the clasp lead being provided only for illustration.

In some embodiments, two or three lengths of rope are braided together to form the handle 105, 205 and the elongate portion 115, 215. The lengths of rope can have any suitable diameter, such as ⅛-inch, ¼-inch, 3⁄16-inch, and so on. For example, for smaller dogs, smaller diameter rope can be used. Certain preferred embodiments use a round braid or a flat braid, but other types of braids (square braids) are also possible. Certain particularly preferred embodiments use a round braid, making the pet leash more visually attractive in a retail setting. In many embodiments, the color of the two or three lengths of rope are carefully selected. For example, a pet leash can include one light-brown length of rope and one dark-brown length of rope, and the pet leash can be marketed for use with a German Shepherd. In another example, a pet leash can include one red length of rope, one white length of rope, and one blue length of rope, and the pet leash can be marketed to those inclined to express patriotism.

The handles 105, 205 of FIGS. 1 and 2 can have many similar characteristics. The handle 105, 205 can include a handle loop 130, 230. In many embodiments, the perimeter of the handle cross-sectional profile is larger than the perimeter of the elongate portion cross-sectional profile. This can make for a thicker, more ergonomic handle 105, 205, which can be advantageous over many conventional leashes. In some such embodiments made of multiple lengths of rope, the lengths of rope can be double braided to form the handle 105, 205, thereby creating the larger handle cross-sectional profile perimeter. In some embodiments, the handle 105, 205 can include a ball or any other suitable leash handle.

Referring still to FIGS. 1 and 2, as shown, the an elongate portion 115, 215 is coupled to, and extends between, both the handle 105, 205 and the lead mechanism 110, 210. The elongate portion 115, 215 can be sized so that the pet leash 100, 200 is of any suitable length. For example, the pet leash 100, 200 can be six feet long, five feet long, four feet long, three feet long, two feet long, one foot long, or any other suitable length.

As is mentioned above, the pet leash 100, 200 can include multiple grip-points 120-124, 220-224 having cross-sectional profile perimeters that differ from that of the elongate portion 115, 215. Grip-point 124, 224 is shown on the elongate portion located near the handle 105, 205. Grip-point 124, 224 has a cross-sectional profile perimeter that is often larger than the perimeter of the elongate portion cross-sectional profile. Grip-point 123, 223 is shown on the elongate portion located between grip-point 124, 224 and the lead mechanism 110, 210. Grip-point 123, 223 has a cross-sectional profile perimeter that is often larger than the perimeter of the elongate portion cross-sectional profile. Grip-point 122, 222 is shown on the elongate portion located between grip-point 123, 223 and the lead mechanism 110, 210. Grip-point 122, 222 has a cross-sectional profile perimeter that is often larger than the perimeter of the elongate portion cross-sectional profile. Grip-point 121, 221 is shown on the elongate portion located between grip-point 122, 222 and the lead mechanism 110, 210. Grip-point 121, 221 has a cross-sectional profile perimeter that is often larger than the perimeter of the elongate portion cross-sectional profile. Grip-point 120, 220 is shown on the elongate portion located between grip-point 121, 221 and the lead mechanism 110, 210. As shown, grip-point 120, 220 is located near the end of the elongate portion 115, 215 opposite the handle 105, 205. Grip-point 120, 220 has a cross-sectional profile perimeter that is often larger than the perimeter of the elongate portion cross-sectional profile. In some embodiments, the cross-sectional profile perimeters of the grip-points 120-124, 220-224 can be smaller than that of the elongate portion 115, 215.

As mentioned above, the illustrative pet leashes 100, 200 of FIGS. 1 and 2 include multiple grip-points 120-124, 220-224, which can allow a pet handler to securely grip the pet leash at the grip-point location without sliding. The grip-points 120-124, 220-224 can be spaced apart from each other at any suitable distance. For example, in some embodiments, the grip-points 120-124, 220-224 are spaced approximately 12 inches apart from each other. In some embodiments, the grip-points 120-124, 220-224 are spaced apart by the number of braids. In some embodiments, grip-points are evenly spaced apart from each other. In some embodiments, grip-points are staggered apart from each other. Though five grip-points 120-124, 220-224 are shown in both FIGS. 1 and 2, a greater or lesser number of grip-points can be used. For example, two grip-points, three grip-points, four grip-points, six grip-points, and so on can be used. In some embodiments, the quantity and spacing of grip-points can be custom tailored to the person who will be using it. In some embodiments, the perimeters of all of the grip-point cross-sectional profiles are substantially equal to one another. In some embodiments, the perimeter(s) of one or more of the grip-point cross-sectional profiles differ from one or more of the other grip-point cross-sectional profiles. For example, the cross-sectional profile perimeter of grip-points 121-123, 221-223 can be smaller than the cross-sectional profile perimeter of grip-point 124, 224.

FIG. 3 shows a more detailed view of a grip-point 325 like the grip-points 120-124, 220-224 of FIGS. 1 and 2. Referring again to FIG. 3, the grip-point 325 has an ergonomic rib 327 to provide enhanced handling. As can be seen, the ergonomic rib 327 extends outwardly from the elongate portion 315 to provide enhanced handling for a hand 329. In many embodiments, the ergonomic rib 327 can be substantially helical.

Each of the grip-points 120-124, 220-224 of FIGS. 1 and 2 can have an ergonomic rib like the ergonomic rib 327 of FIG. 3. Referring again to FIGS. 1 and 2, grip-point 124, 224 can have a grip-point ergonomic rib extending outwardly from the elongate portion 115, 215. Grip-point 123, 223 can have a grip-point ergonomic rib extending outwardly from the elongate portion 115, 215. Grip-point 122, 222 can have a grip-point ergonomic rib extending outwardly from the elongate portion 115, 215. Grip-point 121, 221 can have a grip-point ergonomic rib extending outwardly from the elongate portion 115, 215. Grip-point 120, 220 can have a grip-point ergonomic rib extending outwardly from the elongate portion 115, 215. In some embodiments, one or more of the grip-points can include an ergonomic rib, while one or more of the other grip-points can be without an ergonomic rib.

In some embodiments, the grip-points can play a role in the lead mechanism. For example, in FIG. 2, both grip-point 220 and grip-point 221 can play a role in lead mechanism 210. As is mentioned above, lead mechanism 210 is a slip lead. The slip lead can have a ring 240 (e.g., a D-ring or an O-ring) attached to an end of the elongate portion 215 opposite the handle 205. A section 242 of the elongate portion 215 can extend through the ring 240 to form the adjustable-sized lead loop 227. As the lead loop 227 gets smaller, the ring 240 can engage grip-point 220, thereby preserving the lead loop 227 by preventing the section 242 of the elongate portion 215 from withdrawing from the ring 240. As the lead loop 227 gets larger, the ring 240 can engage grip-point 221, thereby limiting the size of the lead loop 227. In this way, the size of the lead loop 227 can be increased, the lead loop 227 can be slipped over the head of the pet, and the handle 205 can be pulled to decrease the size of the lead loop 227 so that the lead loop 227 engages the pet.

In use, the illustrative pet leash embodiments discussed above can be provided to manage a pet. The lead mechanism can be secured to the pet. The pet leash 100, 200 can be gripped with one hand (e.g., by gripping the handle loop 130, 230 with one hand; by putting one hand through the handle loop 130, 230 and gripping the grip-point 124, 224; and so on). The other hand can grip one of the grip-points 120-123, 220-223 to better manage the pet. To grip one of the grip-points 121-123, 221-223, the other hand can grab the elongate portion 115, 215 nearer to the lead mechanism 110, 210 than the desired grip-point 121-123 and then slide back toward the desired grip-point 121-123 before successfully gripping the desired grip-point 121-123, 221-223 with the other hand to better manage the pet. For example, the hand not already gripping the pet leash 100, 200 can grab the elongate portion 115, 215 between grip-point 123, 223 and the lead mechanism 110, 210 (e.g., between grip-point 123, 223 and grip-point 122, 222) and slide back toward grip-point 123, 223 before successfully gripping grip-point 123, 223 to better manage the pet.

Pet leashes like those of FIGS. 1 and 2 can be constructed in a variety of ways. One illustrative method of constructing a pet leash 100, 200 from two lengths of rope is discussed as follows (though, of course, variations on this method, such as using a greater number of lengths of rope, fall within the scope of the present invention). Two lengths of rope can be cut to a predetermined length that is related to the length of the eventual pet leash according to a predetermined formula that depends on the diameter of the rope, the type of braid to be used, the type and quantity of grip-point to be used, among other factors. The two lengths of rope can each be folded along a fold, with the location of the fold likewise being dependent upon several factors. The fold can then be inserted into a ring on the lead mechanism 110, 210. The free ends of the lengths of rope can be fed through the loops made by the folds and pulled tight, thereby securing the lengths of rope to the lead mechanism 110, 210 and permitting four free ends of the lengths of rope to extend away from the lead mechanism 110, 210.

The four free ends of rope can then be formed into the elongate portion 115, 215, the grip-points 120-124, 220-224, and the handle 105, 205. The first step can be forming grip-point 120, 220 with one of the four free ends. The one free end can be wrapped around the other three free ends and tied in a knot. This process can be repeated several times. This can cause the cross-sectional profile perimeter of grip-point 120, 220 to be larger than that of elongate portion 115, 215. The location of the knot can be varied with each time the free end is wrapped around the other three free ends, thereby creating the ergonomic rib 327 of FIG. 3. In certain preferred embodiments, one or more of the free ends are wrapped ten times around the other three free ends and tied to create grip-point 120, 220. In some embodiments, two of the four free ends can combine to form grip-point 120, 220. For example, if grip-point 120, 220 is wrapped around and tied fifteen times, one of the free ends can be wrapped around and tied eight times with another of the free ends being wrapped around and tied the other seven times. Other examples are possible.

With grip-point 120, 220 completed, the four free ends of rope can be braided (in any of the ways discussed herein or in any other suitable way) to form the elongate portion 115, 215 between grip-point 120, 220 and grip-point 121, 221. Grip-points 121-123, 221-223 can be constructed in a similar way as grip-point 120, 220. In certain preferred embodiments, one or more of the free ends are wrapped ten times around the other three free ends and tied to create grip-points 121-123, 221-223. The elongate portion 115, 215 between grip-point 121, 221 and grip-point 122, 222 can be constructed in a similar way as the elongate portion 115, 215 between grip-point 120, 220 and grip-point 121, 221, as can the elongate portion 115, 215 between grip-point 122, 222 and grip-point 123, 223.

The elongate portion 115, 215 that is nearer the handle 105, 205 than grip-point 123, 223 can extend so that it will be underneath grip-point 124, 224 when grip-point 124, 224 is constructed. The end of the elongate portion 115, 215 can be located near the base of the handle loop 130, 230, and can be tied to fix the length of the elongate portion and leave the same four free ends to create the handle 105, 205. The four free ends can be braided (e.g., a double braid compared to the elongate portion's single braid) to create the handle 105, 205. The other end of the handle loop 130, 230 can be positioned near the end of the elongate portion 115, 215, and one or more of the free ends can be tied into the elongate portion 115, 215 and/or the handle 105, 205. This can fix the size of the handle loop 130, 230, and that size can remain relatively fixed even under stresses associated with ordinary use of the pet leash 100, 200.

With the handle 105, 205 completed, the four free ends can be used to construct grip-point 124, 224. Three of the free ends can be extended along the elongate portion 115, 215 back toward the lead mechanism 110, 210. The other free end can be wrapped around both the other three free ends and the elongate portion 115, 215 and tied to create grip-point 124, 224. Because of this, the cross-sectional profile perimeter of grip-point 124, 224 is larger than that of grip-points 121-123, 221-223 in this example. As is discussed above, in some embodiments, two or more of the free ends can combine to create grip-point 124, 224. In certain preferred embodiments, one or more of the free ends are wrapped fifteen times around both the other three free ends and the elongate portion 115, 215 and tied to create grip point 124, 224.

With grip-point 124, 224 completed, the remaining length of the four free ends (if any) is cut and secured to the elongate portion 115, 215 and/or grip-point 124, 224 (e.g., by melting the respective portions of rope together and/or by tying one or more of the free ends to the elongate portion 115, 215). Thus, in the illustrative method just discussed, one of the lengths of rope is wrapped around the elongate portion 115, 215 to form one or more of the grip-points 120-124, 220-224. In some embodiments, one of the lengths of rope can be wrapped around the elongate portion 115, 215 to form one or more of the grip-points 120-124, 220-224, while another of the lengths of rope can be wrapped around the elongate portion 115, 215 to form one or more of the other grip-points 120-124, 220-224.

In the foregoing detailed description, the invention has been described with reference to specific embodiments. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:

1. A pet leash, comprising:
    (a) a handle;
    (b) a lead mechanism adapted to be secured to a pet;
    (c) an elongate portion coupled to, and extending between, both the handle and the lead mechanism, the elongate portion having an elongate portion cross-sectional profile;
    (d) a first grip-point on the elongate portion located near the handle, the first grip-point having a first grip-point cross-sectional profile with a perimeter that differs from the perimeter of the elongate portion cross-sectional profile; and
    (e) a second grip-point on the elongate portion located between the first grip-point and the lead mechanism, the second grip-point having a second grip-point cross-sectional profile with a perimeter that differs from the perimeter of the elongate portion cross-sectional profile,
    wherein the elongate portion comprises multiple lengths of rope braided together and the first and second grip-points comprise at least one of the multiple lengths of rope wrapped around the other lengths of rope and tied more than once.

2. The pet leash of claim 1, wherein the first grip-point further has a first grip-point ergonomic rib extending outwardly from the elongate portion, and the second grip-point further has a second grip-point ergonomic rib extending outwardly from the elongate portion.

3. The pet leash of claim 2, wherein the first and second grip-point ergonomic ribs are substantially helical.

4. The pet leash of claim 1, wherein the perimeter of the first grip-point cross-sectional profile is larger than the perimeter of the elongate portion cross-sectional profile, and the perimeter of the second grip-point cross-sectional profile is larger than the perimeter of the elongate portion cross-sectional profile.

5. The pet leash of claim 1, wherein the handle has a handle cross-sectional profile with a perimeter that is larger than the perimeter of the elongate portion cross-sectional profile.

6. The pet leash of claim 1, wherein the lead mechanism is a slip lead having a ring attached to an end of the elongate portion opposite the handle, with a section of the elongate portion extending through the ring to form an adjustable-sized lead loop.

7. The pet leash of claim 6, further comprising (f) a third grip-point on the elongate portion located near the end of the elongate portion opposite the handle, the third grip-point having a third grip-point cross-sectional profile with a perimeter that is larger than the perimeter of the elongate portion cross-sectional profile, wherein the third grip-point is adapted to engage the ring, thereby preserving the adjustable-sized lead loop by preventing the section of the elongate portion from withdrawing from the ring.

8. The pet leash of claim 7, further comprising (g) a fourth grip-point on the elongate portion located between the second and third grip-points, the fourth grip-point having a fourth grip-point cross-sectional profile with a perimeter that is larger than the perimeter of the elongate portion cross-sectional profile, wherein the fourth grip-point is adapted to engage the ring, thereby limiting the size of the adjustable-sized lead loop.

9. The pet leash of claim 1, wherein the lead mechanism is a clasp lead.

10. The pet leash of claim 1, wherein two or three lengths of rope are braided together to form the handle and the elongate portion.

11. The pet leash of claim 10, wherein one of the two or three lengths of rope is wrapped around the elongate portion to form the first grip-point.

12. The pet leash of claim 11, wherein the same one of the two or three lengths of rope is wrapped around the elongate portion to form the second grip-point.

13. The pet leash of claim 1, wherein the pet leash is approximately 5 feet long.

14. The pet leash of claim 13, wherein the second grip-point is located approximately 12 inches from the first grip-point.

15. The pet leash of claim 1, further comprising (f) a third grip-point on the elongate portion located between the second grip-point and the lead mechanism, the third grip-point having (i) a third grip-point cross-sectional profile with a perimeter that is larger than the perimeter of the elongate portion cross-sectional profile and (ii) and a third grip-point ergonomic rib extending outwardly from the elongate portion.

16. The pet leash of claim 15, wherein the perimeter of the third grip-point cross-sectional profile is substantially equal to the perimeter of the second grip-point cross-sectional profile but smaller than the perimeter of the first grip-point cross-sectional profile.

17. The pet leash of claim 1, further comprising (g) a fourth grip-point on the elongate portion located between the third grip-point and the lead mechanism, the fourth grip-point having (i) a fourth grip-point cross-sectional profile with a perimeter that is larger than the perimeter of the elongate portion cross-sectional profile and (ii) and a fourth grip-point ergonomic rib extending outwardly from the elongate portion.

18. The pet leash of claim 17, further comprising (h) a fifth grip-point on the elongate portion located between the fourth grip-point and the lead mechanism, the fifth grip-point having (i) a fifth grip-point cross-sectional profile with a perimeter that is larger than the perimeter of the elongate portion cross-sectional profile and (ii) and a fifth grip-point ergonomic rib extending outwardly from the elongate portion.

19. A method of managing a pet, comprising:
  (a) providing a pet leash that includes:
    (i) a handle,
    (ii) a lead mechanism,
    (iii) an elongate portion coupled to, and extending between, both the handle and the lead mechanism, the elongate portion having an elongate portion cross-sectional profile,
    (iv) a first grip-point on the elongate portion located near the handle, the first grip-point having a first grip-point cross-sectional profile with a perimeter that differs from the perimeter of the elongate portion cross-sectional profile, and
    (v) a second grip-point on the elongate portion located between the first grip-point and the lead mechanism, the second grip-point having a second grip-point cross-sectional profile with a perimeter that differs from the perimeter of the elongate portion cross-sectional profile,
    wherein the elongate portion comprises multiple lengths of rope braided together and the first and second grip-points comprise at least one of the multiple lengths of rope wrapped around the other lengths of rope and tied more than once;
  (b) securing the lead mechanism to the pet;
  (c) gripping the pet leash with one hand; and
  (d) gripping the second grip-point with the other hand to better manage the pet.

20. The method of claim 19, wherein the first grip-point further has a first grip-point ergonomic rib extending outwardly from the elongate portion, and the second grip-point further has a second grip-point ergonomic rib extending outwardly from the elongate portion.

21. The method of claim 20, wherein the first and second grip-point ergonomic ribs are substantially helical.

22. The method of claim 19, wherein the handle has a handle cross-sectional profile with a perimeter that is larger than the perimeter of the elongate portion cross-sectional profile.

23. The method of claim 19, wherein the handle comprises a handle loop and gripping the pet leash comprises gripping the handle loop with the one hand.

24. The method of claim 19, wherein the handle comprises a handle loop and gripping the pet leash comprises putting the one hand through the handle loop and gripping the first grip-point.

25. The method of claim 19, wherein the lead mechanism is a slip lead.

26. The method of claim 19, wherein the lead mechanism is a clasp lead.

27. The method of claim 19, further comprising (e) grabbing the elongate portion with the other hand between the second grip-point and the lead mechanism and (f) sliding the other hand back toward the second grip-point before successfully gripping the second grip-point with the other hand to better manage the pet.

28. A pet leash, comprising:
  (a) a handle;
  (b) lead means for securing to a pet;

(c) an elongate portion coupled to, and extending between, both the handle and the lead means, the elongate portion having an elongate portion cross-sectional profile;

(d) first gripping means for allowing a pet handler to securely grip the pet leash at a first location without sliding, the first location being near the handle;

(e) second gripping means for allowing the pet handler to securely grip the pet leash at a second location without sliding, the second location being between the first location and the lead means; and (f) third gripping means for allowing the pet handler to securely grip the pet leash at a third location without sliding, the third location being between the second location and the lead means, wherein the elongate portion comprises multiple lengths of rope braided together and the first gripping means comprises at least one of the multiple lengths of rope wrapped around the other lengths of rope and tied more than once.

29. The pet leash of claim 28, wherein the pet leash is approximately 5 feet long.

30. The pet leash of claim 28, further comprising (g) fourth gripping means for allowing the pet handler to securely grip the pet leash at a fourth location without sliding, the fourth location being between the third location and the lead means.

31. The pet leash of claim 30, further comprising (h) fifth gripping means for allowing the pet handler to securely grip the pet leash at a fifth location without sliding, the fourth location being between the fourth location and the lead means.

* * * * *